Oct. 12, 1954
C. A. BAER
2,691,613
METHOD OF FABRICATING ENVELOPE
EMPLOYING PLASTIC MATERIALS
Filed Feb. 23, 1951
3 Sheets-Sheet 1
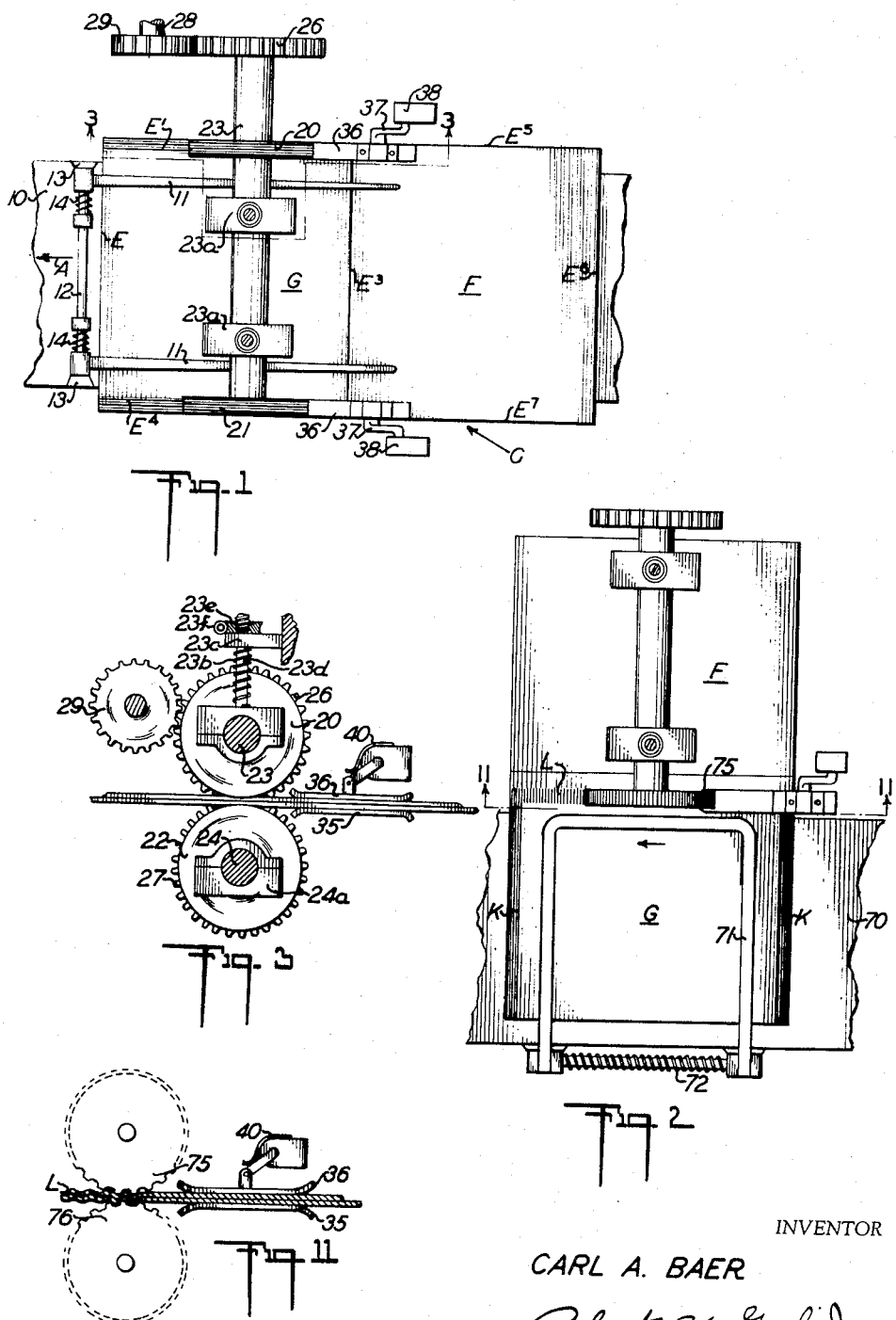
INVENTOR
CARL A. BAER
BY Robert U. Geib, Jr.
ATTORNEY

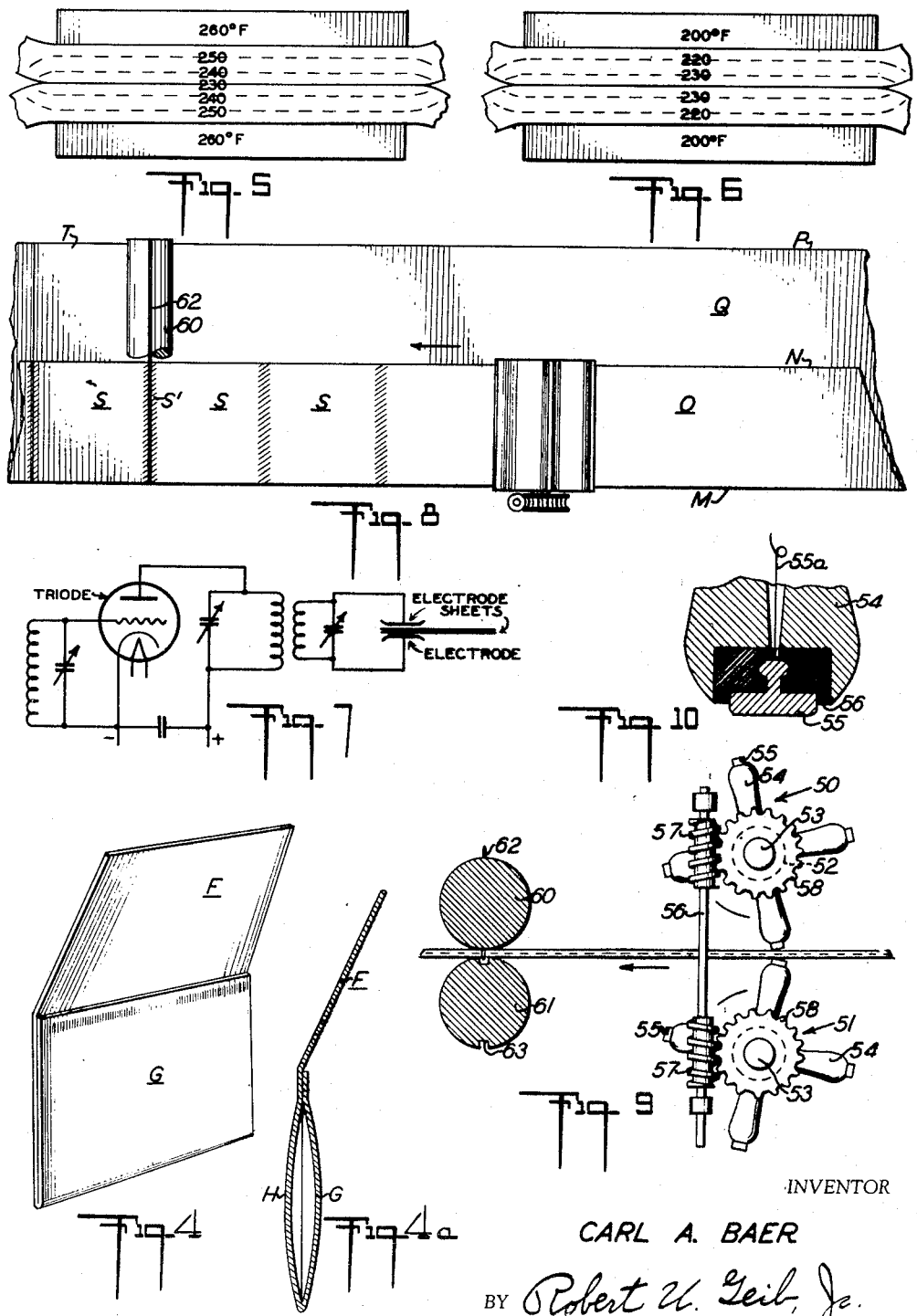

Oct. 12, 1954

C. A. BAER 2,691,613

METHOD OF FABRICATING ENVELOPE EMPLOYING PLASTIC MATERIALS

Filed Feb. 23, 1951

INVENTOR
CARL A. BAER
BY Robert U. Geib, Jr.
ATTORNEY

Patented Oct. 12, 1954

2,691,613

UNITED STATES PATENT OFFICE 2,691,613

METHOD OF FABRICATING ENVELOPES EMPLOYING PLASTIC MATERIALS

Carl A. Baer, Washington, D. C.

Application February 23, 1951, Serial No. 212,394

4 Claims. (Cl. 154—116)

The present invention relates to methods of fabricating envelopes employing plastic materials and particularly to methods of fabricating hermetically sealed envelopes of sheets of material which are at least partially plastic.

Sealed envelopes for the packaging of materials become increasingly popular, being relatively inexpensive to fabricate, readily filled with materials, easily handled when in use and providing an attractive container for the packaged goods. A feature of paramount importance is the ability of an envelope fabricated of moisture-resistant material to retain and protect goods requiring protection from moisture for indefinite periods of time. Certain types of foodstuffs must of necessity be hermetically sealed in containers or will deteriorate rapidly. Other materials should be packaged in hermetically sealed containers in order that the moisture contents thereof may be maintained until the time of use. Tobacco, for instance, when packaged at the plant of a tobacco processor should be stored in a hermetically sealed container until the time of use has actually arrived.

In my Patent No. 2,373,285, granted April 10, 1945, there is disclosed and claimed a container which is eminently suitable for the packaging of many materials and which, when used, will serve to protect the contents fully and efficiently against loss of moisture and against penetration of moisture or air from the outside. The package of Patent No. 2,373,285 is fabricated of sheet material which may be one or more plies in thickness but which includes in every instance at least two films or thicknesses of thermo-plastic material which are brought together in contiguous relationship and sealed. The films which are to be joined are fabricated of materials which are free from tackiness at normal atmospheric temperatures and which have such thermo-plastic cohesive properties that they may be selectively bonded together either permanently or superficially by the application of heat and pressure. Thus the thermo-plastic sheets or films may be permanently sealed by pressing the contiguous areas of those sheets together while heated to a temperature sufficiently high to cause cohesion and permanent union thereof; or the sheets may be superficially sealed together by the application of pressure at a temperature below the temperature causing cohesion and permanent union of the films. The permanent seals thus formed unite contiguous areas of the two thermo-plastic films or thicknesses by causing them to coalesce and to merge so firmly that the seal may not be broken without destriction of one or both of the films so sealed together. The superficial seals formed, however, are of such nature that the films are adhesively secured together and may be readily separated by hand without injury to either one to permit access to the material storage space through a smooth surfaced throat or goods discharge passage. In other words, by subjecting contiguous areas of two mutually facing films or thicknesses of thermo-plastic material to different treatments two such areas may be permanently sealed together, whereas other areas may be superficially sealed together. The superficially sealed areas may be readily separated by simply pulling one sheet away from the other and the separation is clean-cut, neither sheet being injured during the process of separation. In the pouch disclosed in my Patent No. 2,373,285 the superficial seal is at the mouth of the pouch and the consumer who buys the package may open it without injury to any part in order to obtain access to the contents which may be tobacco, etc. The package may thus continue to serve as a storage receptacle or pouch from which tobacco in small quantities may be removed from time-to-time. Even when the package is to be destroyed or discarded after having been opened, it is highly desirable to superficially seal certain portions of the envelope together so that it may be quickly and easily opened. In certain containers for tobaccos and hygroscopic food articles, it is desirable to superficially seal two or more sides or portions of the envelope. Accordingly, the container of the present invention may include superficial seals, but no permanent seal.

The specific nature of the thermo-plastic material to be subjected to the improved process in the fabrication of envelopes or containers may vary somewhat in composition, although such material should, in any event, have the physical characteristics above specified. Materials suitable for the intended purpose include polyethylene, rubber hydrochloride commercially known as "Pliofilm," chlorinated rubber known as "Pliolite," alkyd resins, phenol aldehyde resins, vinyl acetate known as "Vinylite," polyvinyl chloride known as "Koroseal," vinylidene chloride known as "Saran," cellulose derivatives such as cellulose esters and cellulose ethers when properly plasticized with selected plasticizers in suitable amounts, copolymers of butadiene and styrene known as "Synthetic Rubber GRS," polystyrenes, nitrocellulose coatings properly plastcized with selected plasticizers so as to be suitably thermoplastic, inert protein polymer known as "zein" properly formulated and plasticized, and other generally similar compositions of thermo-plastic materials which are free from tackiness at normal atmospheric temperatures but have such thermo-plastic cohesive properties that they may be selectively bonded together permanently or superficially by the application of heat and pressure in accordance with the method first disclosed and claimed in my aforementioned patent.

Prior to the invention which is disclosed and claimed in my patent application Serial No. 642,564, now abandoned, in carrying out the method referred to and in producing the novel moisture excluding pouch described hereinbefore, I effected both the permanent and superficial seals by bringing together in face-to-face relationship selected areas of thermo-plastic film and applied the heat and pressure which must necessarily be used to effect such seals by means of heated members which are brought to bear upon the outer faces of the sheet material undergoing the sealing operation. Accordingly, the heat flow into the thermo-plastic material was from the exterior and it was necessary, of course, to apply to the sheets to be sealed elements heated to temperatures higher than the temperature necessary to condition the contacting faces of the thermo-plastic material for sealing. In mechanical heating such as thus heretofore practiced, the heat is applied to the exterior surfaces of the sheet material and travels inwardly by thermal conduction. This mechanical process is somewhat difficult to accurately control, the operator having but little knowledge of the temperatures actually developed in the thermo-plastic material and being forced to regulate the process only by observation of the product produced.

In my patent application Serial No. 642,564 I disclose and claim the employment of radio frequency heating to bring the thermo-plastic material into condition for permanent or superficial sealing. As a result of the application of radio frequency, or dielectric, heat the highest temperatures are developed in the center of the work, midway between the electrodes. This causes the plasticizers and solvents to concentrate where the juxtaposed thicknesses of the sheet-like material make contact and the seal is to be produced. As a result a separable superficial seal may be produced by the application of pressures somewhat lower than those employed when heat is applied by mechanical jaws or rollers which are themselves heated electrically. Both the radio frequency and the power input may be varied in order to develop in the material lying between the electrodes the necessary amount of heat. Thus, in the heating of thermo-plastic materials of the thicknesses commonly employed in the fabrication of envelopes or containers the frequency and power may be varied from 500 watts at 300 megacycles to 10 kilowatts at 30 megacycles. The load circuit may be tuned readily to take care of different kinds and varying thicknesses of sheet materials, as previously stated, and one practicing the process may readily adjust the mechanism provided by varying the intensity of the radio frequency electric field so that the material passing between the electrodes is subjected to the proper heat, whether this material comprises simply juxtaposed films of thermo-plastic material or comprises juxtaposed films of thermo-plastic material which are provided with backing sheets of paper, cellophane, glassine, acetate or foil; or any combination thereof. Heat is created in the material itself and is uniform over the mutually facing areas of the thicknesses of the sheet-like material being united. Loss of heat by radiation and conduction results in the creation of higher temperatures toward the abutting surfaces being joined and lower temperatures outside of these innermost areas, the hottest place being in the center of the work or midway between the electrodes.

It is advantageous to pass articles to be sealed quickly through the sealing means, whether they be in the nature of tobacco pouches, envelopes for medicines or drugs, etc. The containers to be sealed may be clamped upon a conveyor belt and the areas to be sealed may be passed between two metal rolls, the peripheral speed of each of which is the same as the linear speed of the conveyor belt, the two rolls being connected to a source of current and comprising the actual electrodes. The shafts upon which the rolls are mounted are relatively displaceable and means is provided to yieldably oppose their separation, this means being adjustable so that the normal pressure of each roller against the other may be regulated and the amount of pressure applied to the work controlled, such pressure being maintained substantially uniform despite variations in thickness of the work. Preferably, however, when rolls are used in forming superficial seals, they function only as pressure applying rolls, the electrodes being separate therefrom and positioned to heat the material of the work just prior to its entry between the rolls.

The improved method of sealing lends itself particularly to high-speed fabrication of envelopes or containers, it being possible to more rapidly and accurately heat the thermo-plastic material to the proper temperatures even while such material is in motion, thus making it possible to seal in a continuous manner envelope material which is passed, as by means of a conveyor, through a station at which there are located the heat and pressure applying instrumentalities.

To facilitate the carrying out of the foregoing process, I have provided the improved machine of my patent application Serial No. 642,564 by means of which not only the permanent sealing of contiguous portions of thermo-plastic films may be effected, but likewise the continuous formation of superficial seals, an operation requiring more precise control than that of the permanent seal. The improved mechanism of said patent application may have various embodiments. According to one of said embodiments means is provided for the application of pressure to the outermost faces of sheets being sealed together, the thermo-plastic sheets or films having been heated and softened just previously to their entry into the pressure producing mechanism, by means of the radio frequency heating devices. In other words, the radio frequency heating means is positioned anterior to a pressure-applying means so that the seal, which may be permanent or superficial depending upon the temperature to which the material is heated just prior to the application of pressure, is continuously effected by passing sheet material first between the electrodes of the heating device and then between the pressure applying elements, the speed of movement of the work being such that the pressure is applied while the thermo-plastic material is in the desired condition of plasticity. As stated in my patent application Serial No.

642,564, clamping jaws may be utilized in the formation of the superficial seal, in lieu of rolls, if desired, these jaws being intermittently actuated to establish complete individual seals upon successive operations.

The present application is a continuation-in-part of my patent application Serial No. 642,564.

In the accompanying drawings several embodiments of the invention are illustrated by way of example. No attempt has been made to illustrate all minor mechanical details of such mechanisms, the drawings being to a certain extent diagrammatic. It will be appreciated by one skilled in the art that other types of mechanisms may be developed for the purpose of effecting the sealing of containers or packages which differ widely in size, shape and in the sheet material of which they are fabricated, all without departure from the spirit of the present invention.

In the drawings:

Figure 1 is a plan view of a mechanism for simultaneously effecting two seals along the opposite edges of a container which may, for instance, be a tobacco pouch, while the sheet material is in motion.

Figure 2 is a view similar to that of Figure 1 and disclosing a mechanism for effecting a further seal, which may, for instance, be a superficial seal closing the pouch or envelope after it has been filled.

Figure 3 is a section on the line 3—3 of Figure 1.

Figure 4 is a perspective view of a tobacco pouch or envelope which may be taken as typical of many types and shapes of containers or envelopes which may be sealed in accordance with the present method and by the use of the apparatus disclosed, or similar apparatus.

Figure 4a is a transverse sectional view through the pouch shown in Figure 4.

Figures 5 and 6 are diagrams, Figure 5 showing the temperatures of the metal jaws and interior zones of two sheets of thermo-plastic material being sealed under the action of mechanical sealing jaws which are electrically heated and Figure 6 showing corresponding temperatures of the electrodes and thermo-plastic sheets when radio frequency, or dielectric, heating is practiced.

Figure 7 is a circuit diagram of a satisfactory circuit arrangement whereby radio frequency field may be created between the electrodes of the apparatus.

Figure 8 is a fragmentary plan of a further form of apparatus by means of which permanent or superficial sealing of containers may be effected while the thermoplastic material continuously moves along a conveyor.

Figure 9 is a fragmentary side elevation of the mechanism illustrated in Figure 8, both figures being rather diagrammatic.

Figure 10 is a sectional view on the line 10—10 of Figure 8, but on a somewhat larger scale.

Figure 11 is a sectional view on the line 11—11 of Figure 2.

Figure 12:
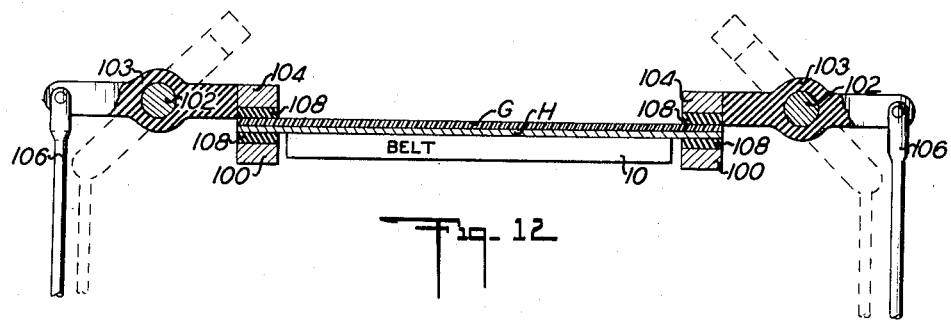
Figure 12 is an elevational view, partly in section, of a modified form of high-frequency electrode.

In that embodiment of the mechanism of the invention which is illustrated in Figure 1 of the drawings a conveyor apron or belt is indicated at 10, the same being of any ordinary or usual type, preferably endless and mounted for movement in the direction indicated by the arrow A. Upon the conveyor 10 at spaced intervals are mounted envelope retaining arms 11, these arms being preferably parallel and extending longitudinally of the conveyor as shown in Figure 1. Each envelope retaining arm 11 has one end mounted upon a transversely extending rod 12, the ends of the latter being rotatably supported in bearings formed within small brackets or mounting members 13 which are secured to and carried by the conveyor belt 10. Two torsion springs 14 encircle the transverse shaft 12; one end of each spring being connected to the associated mounting member 13 and the other end connected to or resting upon the adjacent envelope retaining arm 11. By means of the springs 14 the arms 11 are normally urged downwardly into contact with the conveyor belt 10 so as to retain, securely clamped between the arms 11 and the belt 10, sheet material of which contiguous areas are to be sealed together.

Such an article, as immediately aforementioned, is indicated at C in Figure 1, and in this instance comprises an elongated sheet which may be of one or more plies in thickness and which has been reduced in length approximately one-third by folding over one end thereof, that portion of the sheet which is defined by the edges E, E', E³ and E⁴ having been folded over and directly overlying a portion of exactly equal area so as to form a pouch or sack, the fold line being indicated by the letter E. That portion of the sheet which, as viewed in Figure 1, is to the right of the edge E³, and which is further defined by the edges E⁵, E⁶ and E⁷, is of single thickness and constitutes a flap for eventual folding over the pouch or sack defined by the two first-mentioned portions. In Figures 1, 2, 4 and 4a, the flap panel just described is indicated at F, and the two substantially parallel panels which together form the sack are indicated at G and H, respectively, the panel G being visible in Figure 1, but the panel H being hidden in this figure.

Referring particularly to Figure 3, pressure applying means for pressing together contiguous selected superposed areas of the panels H and G comprises two pairs of opposed disks or rolls, the uppermost of these rolls being indicated at 20 and 21, respectively. One of the lower rollers is indicated at 22, and it is shown as disposed directly below the roller 20. A fourth roller (not illustrated) directly underlies the roller 21. The rolls 20 and 21 are mounted upon a horizontal shaft 23; and the second and lower pair of rolls (one of which is the roll 22) is mounted upon a generally parallel shaft 24 which lies directly below the shaft 23 and in parallelism therewith. The parallel shafts 23 and 24 are disposed transversely of the path of movement of the conveyor belt 10, the shaft 23 being above the belt and the shaft 24 being below the belt as shown. The cylindrical surface of each work-engaging roll is provided with alternate circumferential grooves and ridges and the ridges of one roll of each pair are opposed to the grooves of the second roll of that pair, the purpose being to so dispose the roll surfaces that the sheet material passed between them will be corrugated and the resultant seal rendered somewhat more stiff by reason of the corrugations thus placed in the material.

The aforementioned rolls are positively driven at the same peripheral speed. In the mechanism shown in Figure 3, the rolls of each pair are of the same diameter, and the shafts 22 and 24 are geared together by gears 26 and 27, respectively, which are also of the same diameter, the construction and arrangement being such that the surface of one roller must necessarily move at the same linear velocity as the surface of the second roller. A drive shaft is indicated at 28, this shaft being connected by means of a gear 29 with the gear 26 so that the shafts 23 and 24 and the four rollers mounted thereon may all be driven at the desired angular velocity.

The shafts 23 and 24 are mounted in suitable supporting bearings and means is provided in association with these shafts and bearings for causing the shafts, and hence the rollers mounted thereon, to bear against the sheet material passing therebetween with a predetermined degree of pressure, this means being adjustable so that the pressure applied in any one instance shall be that which is desired and necessary to effect either the permanent sealing or the superficial sealing of the sheet material, the temperature of the material, of course, having previously been elevated by heating means.

Thus, the lower shaft 24 may be supported in fixed bearings, one of which is indicated at 24a in Figure 3; and the upper shaft 23 may be supported in bearings 23a (roller bearings or otherwise) which are vertically movable and normally urged downwardly by yielding means, such as helical springs 23b. The upper end of each spring rests against an abutment 23c which is adjustably supported upon the main frame of the machine (not illustrated) in such manner that it may be moved vertically to relieve or further increase the spring tension. Rods 23d serve to support the springs against lateral collapse, these rods being mounted on the bearings 23a.

The electrodes by means of which the sheet material passing through the apparatus is dielectrically heated to the desired temperature just prior to movement thereof between the sets of pressure rollers are indicated at 35 and 36, respectively, these electrodes comprising metallic members which are mounted in such manner as to be relatively movable. The lower electrode 35 is preferably fixed in position. The upper electrode 36 is fixed upon the lower end of a pivoted arm 37, the upper end of which is rotatably mounted in a bearing carried in a fixed bracket 38 which forms part of the frame of the machine or which is attached thereto. A light spring 40 is mounted upon the bracket 38 in such manner that its free lower end constantly bears upon the arm 37 and thereby causes it to rock downwardly, carrying with it the electrode 36. The action of spring 40 may be controlled by means of any suitable regulating or adjusting device, in such manner as to cause the electrode 36 to exert a greater or lesser pressure upon the material passing between the electrodes. The pressure should be sufficiently great to cause the two mutually facing thicknesses or films to continuously contact each other over the surface areas intermediate the electrodes in order that the dielectric heating effect of the current shall at all times be uniform over the entire areas of those portions of the contacting thicknesses through which the current is passing.

If a superficial seal is to be effected, the current will be so regulated, and the pressure of the rollers will be so controlled, that the desired result is obtained. The same mechanism may be employed to continuously form permanent seals, and in such instance, the heating effect of the current is increased; and the pressure imparted to the material by the rollers above and below the same may be suitably modified or reduced.

The electrodes may be of any suitable material, depending upon application. In certain instances, the small electrodes 35 and 36 are preferably of copper. Wherever the backing sheets consist of an electrically-conductive metallic foil on the outside which would come in contact with the electrodes, the contacting surfaces of the electrodes must, of course, be insulated. This may be done by a uniform coating of Bakelite or thin mica sheets over the contacting surfaces of the electrodes either of which may be securely adhered to the metal electrodes by means of an adhesive such as Cyclo-weld. In the case of Bakelite, the metal electrodes may first be coated with a thin layer of Cyclo-weld and then heated to 100 degrees C. Then, a thin coating of Bakelite may be applied over the coating of Cyclo-weld, after which it may be baked at a temperature of 300 degrees C., thus producing a thin smooth durable coating that will adhere firmly to the metal electrode and insulate the contacting surface from the electrically-conductive metallic foil.

Any suitable means may be employed to interrupt, if desired, the heating effect of the current as the edge $E^3$ passes the electrodes, so that the margins of the flap F will not be heated. If desired, means can be utilized to separate the rolls as the flap F passes therebetween if these margins are not to be corrugated.

In the form of the apparatus disclosed in Figures 8, 9 and 10, sheet material is passed first through a means for simultaneously applying heat and pressure to selected areas of contiguous portions and thereafter through a flying shear or other cut-off device by means of which it is severed into individual sections, each comprising a unit such as a pouch. In this case, a strip of sheet material, which may be of one or more plies in thickness, is first folded over to form an elongated continuous sack, the upper portion or strip of which is defined by the edges M and N, the edge M being the fold line and the strip O thus described being superposed upon the wider strip defined by the edges M and P. That portion of the material which lies between the lines N and P in Figure 8 comprises a strip constituting a series of connected container flaps. The means for sealing the superposed portions of the continuous strip at exact intervals comprises upper and lower heat-and-pressure applying instrumentalities generally indicated, in Figure 9, at 50 and 51, respectively.

More specifically, the upper and lower heat-and-pressure applying instrumentalities 50 and 51 each comprises a hub 52 mounted on a rotatable shaft 53. Each of the hubs 52 is provided with a series of radially extending and equally spaced frames 54; the latter being shown as four in number and therefore spaced at 90° angles with respect to each other. According to this construction and arrangement, the radially extending and equally spaced spoke-like frames form rotatable spiders, outer ends of the frames or spokes being adapted to carry elongate bars 55 which function as electrodes and also as pressure applying elements. Each of the elongate bars 55 is mounted directly on a cushion of resilient insulating material, such as neoprene, and connected with a source of current for heating purposes.

As shown in Figure 9, the two rotatable shafts 53 are disposed in horizontal parallelism, the distance between them being such that their respective elongate bars 55 may assume closely opposite positions. That is, the opposed elongate bars 55 may receive between them transversely moving sheet material of double thickness and set up within those areas of the superposed sheets which lie intermediate said elongate bars a radio frequency field which is adequate to effect coalescence of the material. As previously stated, in certain instances, it is desired that the dielectric heat created in the materials and application of pressure be such as to form only a superficial seal; whereas in other instances, it may be desired to form a permanent seal.

The spiders which comprise the hubs 52, radially extending frames or spokes 54 and elongate bars 55, are driven in any suitable manner. For example, there may be provided a vertically extending drive-shaft 56 carrying oppositely operable worms 57 which mesh with, and drive, worms 58 which are affixed to the superposed rotatable shafts 53. When the drive-shaft 56 is rotated, the elongate bars 55 will be successively brought together in pairs to create heat in the specified manner and also apply pressure; the mode of operation being predetermined and at equal intervals as the sheet material passes through the machine.

Each of the elongate bars 55 is of such width as to form a seal which is twice as wide as may be necessary.

After the formation of such a seal, the sheet material passes to a suitable severing device which may take the form of a flying shear comprising rotating elements 60 and 61, one of which is provided with cutting blades 62 and the other with cooperating recesses 63 which receive the cutting blades 62. By means of these instrumentalities, the continuous strip is severed into short sections, the incisions being midway of the width of each previously created seal, as indicated in Figure 8, in order that each unit delivered by the machine will, as indicated in Figure 8, comprise a pouch portion S having a relatively narrow edge seal S' and a flap portion T which may be subsequently folded over onto the pouch portion.

The aforementioned apparatus, when required to do so, will operate at high speed without sacrifice in the quality of the product.

When forming permanent seals along opposite margins of pouches in accordance with the novel method and by the novel apparatus illustrated in Figure 1, it is feasible to seal 75 to 100 pouches per minute. For example, in the case of pouches formed from blanks 12 inches long by 5 inches wide, fabricated of laminated sheets including foil and vinylite layers folded so as to form a pouch 4 inches deep, with a 4 inch flap, these pouches being spaced along the conveyor at intervals of 12 inches, sealing at the stated rate of 75 to 100 pouches per minute may be effected. In this case, the electrodes may each be 2 inches long by ¼ inch wide and the heating interval is $\frac{1}{7}$ to $\frac{1}{10}$ of a second for each seal to be effected. The pouch, of course, comprises two thicknesses of sheet material while the flap consists only of one thickness of sheet material with the thermo-plastic surface of that material facing upwardly.

As previously stated, it may be desired to have the current supply to electrodes 35 and 36 interrupted while the margins of the flap F of each succesive blank are passing between the electrodes so that the thermo-plastic along the edges of the flap will not be heated and softened. As will be understood by those skilled in the art, this objective may readily be accomplished by the use of an electric eye which is actuated by the pouch or the change in current in the electric circuit itself caused by change in thickness of sheets passing between the electrodes; and other devices for intermittently interrupting the current may be provided, if necessary, so that the current will not pass between the electrodes when sheet areas which need not be heated are passing or when no sheets are interposed between such electrodes.

In practicing the process of the present invention with the aid of the apparatus illustrated in Figures 8 and 9, the sheet material may be laminated or not, as desired. For instance, a laminated sheet comprising superposed layers of foil and thermoplastic film which may be, for instance, 12 inches wide, may be folded over a forming board so that the pouch fold, i. e., the distance between edges M and N in Figure 8, is 4 inches deep and flap, i. e., the distance between edges N and P in Figure 8, is also 4 inches. In passing between the rotating frames 59 and 51 a permanent seal may be formed every 5 inches, this seal extending across the pouch as illustrated transversely of the direction of movement of the strip and also being, as aforementioned, twice as wide as the finished seal.

Mechanism controlled by an electric eye may be employed to vary the speeds of rotation of the spiders 50 and 51 with respect to the linear speed of the oncoming strip in order that the seals may be established at the correct intervals along the strip with regard to the printed matter thereon, and thus compensate for any possible stretching of the laminated sheet in the laminating and printing operations.

As before stated, the elongate bars 55 are electrically connected to a current source by any suitable means, one form of which may comprise a conductor 55a. The yielding insulating base within which the electrode is mounted permits it to readily rock about its longitudinal axis when it comes into contact with the material to be heated so that its work engaging face may promptly move into parallelism with the work engaging face of the opposing electrode to insure the application of uniform pressure to the work over the entire area of the portion being treated.

After the parallel lateral margins of the pouch have been permanently sealed together, with the aid of either the machine of Figures 1 and 3 or that shown in Figures 8, 9 and 10, each pouch is charged with any material to be dispensed, such as tobacco; and it is then in order to establish the superficial seal across the mouth of the pouch. A suitable means for performing this function is illustrated in Figures 2 and 11, the same comprising a travelling endless belt 70. The endless belt 70 is provided with attached pouch clamping members 71 which are resiliently urged toward the belt by springs 72 in order to temporarily hold pouches upon the upper surface of the belt with their flaps projecting. One pouch thus secured is illustrated in Figure 2, the front panel of the pouch being indicated at G and the projecting flap at F. The permanently sealed lateral margins are indicated at K and a partially completed superficial seal at L.

The mechanism for effecting the superficial seal L may in substance be the same as that which has previously been described in connection with the formation of the permanent seals, including upper and lower pressure rolls 75 and 76, and associated roll supporting shafts, driving gears and supporting bearings. The heating means may be identical, but will, of course, be utilized to condition the sheet material for superficial sealing instead of permanent sealing. The rolls 75 and 76 are shown as grooved in a direction which is longitudinal with respect to their axes of rotation, instead of being grooved circumferentially as in the case of the rolls of the embodiment of Figure 1. Referring to Figure 11, the grooves in the rolls 75 and 76 are so disposed that a ridge or rib of one roll is opposed to a groove in the other, in order that the resulting superficially sealed areas of the pouch will be slightly ribbed as shown in both Figures 2 and 11.

In all other methods of heating (excepting, of course, chemical reaction) the source of heat is outside the material. No matter how produced, such heat must start at the outside of the material being heated and travel inward by thermal conduction. As is well-known, radio-frequency heat, on the other hand, is produced in the material itself. The heat is produced simultaneously throughout the area to be heated and, except for the effect of radiation and conduction losses, is uniform throughout. The only flow of heat is the slight outward flow due to these losses.

When heating overlapped thicknesses of thermoplastic sheet-material with radio frequency current, the hottest place is, of course, in the center between the electrodes. This, apparently, causes the plasticizers and solvents to concentrate at this center where the seal is to be produced. As a result, when the temperature in the thermoplastic sheets is lowered below the temperatures which cause cohesion and permanent union, a separable superficial seal may be produced with relative less pressure than when heat is applied by mechanical means.

Apparently this is caused by a combination of the two following conditions:

1. The greater accuracy of control of heat generated by radio frequency heating wherein the permanent seal may, for example, be made at 300 million cycles per second, thereby permitting a relatively large range of decrease capable of producing a superficial seal accurately; and 2. As radio frequency produces heat at midpoint between the thicknesses of the overlapped sheets, the solvents and the plasticizer concentrate at the contacting surfaces thereof with the result that these surfaces are extremely sensitive; and, the reversal of the molecules of the material making up these contacting surfaces causes a locking action so that the sheets coalesce preferably when making the permanent seal without curing action, or injury to the thermoplastic material, and, at the reduced temperatures, produces a uniformly dependable superficial seal.

The aforementioned "locking action" may be explained by considering the molecules of the thermoplastic material (i. e., monomers, polymers or co-polymers) held in contact by a viscous substance as similar to the fingers and hands of gloves. When heat other than radio frequency is utilized, such heat finds considerable resistance in its passage through the material being heated and the contacting surfaces are quite irregular whereby greater amounts of heat are necessary to make the material flow and bond. In the case of radio frequency heating, however, these finger-like molecules are reversed from, say, 30 to 300 million times a second, with the result that these moving fingers on one surface readily lock with those of the opposing surface so that, with less heat created, a perfect coalescent seal is made without any curing or deteriorating action to the material itself.

When permanent seals of the type referred to are produced when utilizing other than radio frequency heating, it is necessary to apply heat of much higher magnitude in order that the proper amount of heat may be transferred to the surfaces to be sealed. This heat of higher magnitude is liable to cause the material to flow too rapidly and thereby permit the overlapping thicknesses of the sheet-like thermoplastic material to be squeezed together into a thin crosssection, thus curing the material by this excessive heat and the flowing action to a point where, after the sealed material solidifies, it is of much lesser strength than before. I have found that when using heat other than that of radio frequency, the seal is the weakest point and will open before the remainder of the material will tear, even though the seal is well made and the material kept in contact until the seal hardens. In the case of radio frequency, or dielectric, heating, there is no curing action of the material making up the seal, as it remains as soft as the remainder of the thermoplastic material, and resists tearing more than the sheet itself.

I have discovered that, when using radio frequency heat, both permanent and superficial seals may alone be produced by any of the electrodes described herein, including the superposed rolls of Figures 1 and 3, the superposed jaws 35 and 36 of Figure 3 or by bars of the type which are shown as mounted on the superposed rotary frames 50 and 51 of Figures 8, 9 and 10.

As previously stated, the thicknesses of the overlapped thermo-plastic sheets between the electrodes become heated at their adjoining surfaces due to the friction of high molecular reversal of the material and coalescence, which may be aided by slight pressure of the spring action of the electrodes.

If the superficial seal were to be made without the use of radio frequency heat, it would be necessary to apply greatly increased pressure over that which would be necessary to make a permanent seal and to reduce the heat which is applied to the sheets. While using radio frequency heat, I have demonstrated that with opposed jaws of approximately 6 inches in length and approximately ⅛ of an inch in width that at approximately 5 pounds' to approximately 10 pounds' pressure both permanent and superficial seals may be formed.

The aforementioned superficial seal may be produced simply by reducing the heat at the contacting surfaces of the thermo-plastic material. In making the permanent seal, superposed rolls, such as 75 and 76 in Figure 11, may, as previously stated, be used to apply light corrugating pressure after the seal per se has been formed. On the other hand, heavier pressure may be used, in which event, still less heat would be necessary.

Referring again to Figures 1 and 2, the effective areas of the superposed clamps or jaws 11 and 71 should, under all circumstances, be disposed closely adjacent the sealed edges. At the instant of flowing and coalescing of the thermoplastic material, it has no structural strength; and, if the plies or overlapping thicknesses were allowed to separate, the seal would be broken. Therefore, the opposed thicknesses of thermoplastic material must be held together regardless of the type of electrodes which are used, and whether or not pressure is applied by them.

As before stated, the electrodes which establish the radio frequency heat may assume any one of a number of types, regardless of whether they actually apply pressure in the formation of the seal. In certain instances, as when forming seals which are more or less superficial in nature, the radio frequency heat is alone sufficient, thereby rendering unnecessary the application of pressure either by the electrodes themselves or by separate instrumentalities which follow in the processing operation.

In any event, the electrodes and/or pressure-applying means, if any, may be suitably adjusted toward and away from the overlapping thicknesses of the thermoplastic material by any of a number of well-known means. In using the electrodes shown in Figures 12 and 13, they may be moved toward and away from the work by cams, etc. (not shown); while the roll-type electrodes and/or pressure-applying means, if any, may be adjusted toward and away from the work by means such as that illustrated in connection with the rolls 20 and 21 of Figure 3, said means comprising the threading of the upper end of the rod 23d in order that it may receive a worm wheel 23e, the latter receiving rotation from a suitably driven and adjacently disposed worm 23f.

Figure 13:
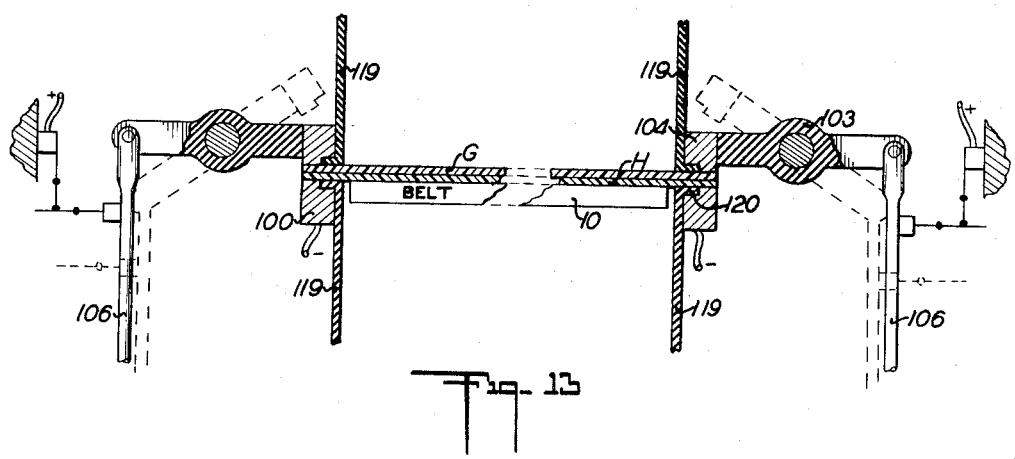
Figure 13 is a view which is similar to Figure 12, but disclosing a further modification.
Figure 14:
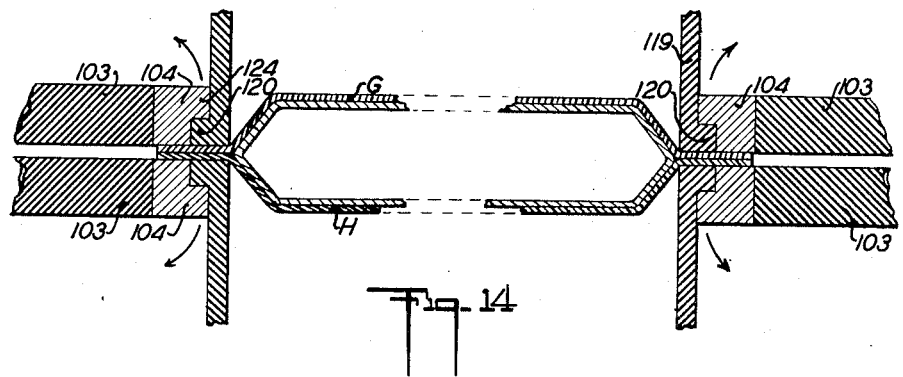
Figure 14 is a view similar to Figure 13, but on an enlarged scale and disclosing the thermoplastic materials to be sealed as mounted upon a mandrel.

In Figures 12, 13 and 14 of the drawings, there is illustrated a modified electrode construction which, in each of these instances, comprises a lower stationary bar-type high-frequency electrode and a cooperating upper and movable bar-type high-frequency electrode, said electrodes being operable to effect either permanent or superficial seals of the types referred to hereinbefore.

In Figures 12 and 13, one of the lower stationary bar-type high-frequency electrodes is shown as extending along each side of the endless conveyor belt 10 and slightly below the upper surface of the latter; while in Figure 14, a mandrel K is shown in lieu of said endless conveyor belt.

According to each of these forms of the apparatus of the present invention which is illustrated in Figures 12, 13 and 14, a suitably mounted shaft 102 is disposed outwardly and above each of the lower stationary bar-type electrodes and in axial parallelism therewith, a rocker arm 103 being mounted on each of said shafts.

The inner end of each of the rocker arms 103 carries a bar-type high-frequency electrode 104 which is adapted for cooperation with the adjacently disposed lower bar-type electrode 100. The outwardly extending end of each of the rocker arms 103 carries a pivotally attached and depending rod 106, the latter being raised and lowered by any one of a number of well-known suitable operating mechanisms which, as such, form no part of the present invention and are, accordingly, neither specifically described herein nor referred to hereinafter. As shown in the heavier sectioned portions of Figure 12, the upper faces of the lower electrodes 100 and the lower faces of the upper electrodes 104 may be provided with a suitable electrical insulating material 108, the purpose of which is to prevent short-circuiting in the event the material to be sealed is provided with an outer cover or coating of electrically-conductive material.

Referring to Figure 13, the endless conveyor belt 10 advances the thermoplastic material with the edges of its superposed thicknesses G and H overhanging. As the endless conveyor belt 10 moves these overhanging edges of the superposed thicknesses G and H between the lower and upper electrodes 100 and 104, respectively, it comes to a temporary stop of extremely short duration, at which time the rods 106 are automatically elevated to cause the insulating material 108 on the adjacent faces of the electrodes 100 and 104 to contact the aforementioned portions of the thermoplastic material. If desired, the electrodes 100 and 104 may be permanently supplied with suitable high-frequency current, or, on the other hand, the high-frequency current may be periodically supplied at suitable intervals. In any event, it is only necessary that the electrodes 100 and 104 apply high-frequency heating currents to the material to be sealed for but a very short interval of time, after which the rods 106 are automatically lowered, thereby effecting the separation of the electrodes 100 and 104.

In Figure 13, there is shown a means for effecting the separation of the electrodes, together with delayed-action means for maintaining the superposed and heated thickness of thermoplastic material in contacting relationship for a sufficient period of time to enable the proper setting thereof.

According to the construction and arrangements of the elements of the apparatus of Figure 13, there is substituted for the insulating material 108 of Figure 12 a pair of upper and lower vertically disposed strips of insulating material 119, each of which is provided with a right-angularly disposed and inwardly extending foreshortened foot portion 120. Each of the movable electrodes 104 is recessed as at 124, to receive, in flush relationship, the foot portion 120 of the adjacent vertically disposed strip 119 of insulating material. According to this construction, the movable electrodes 104 may be removed from the material to be sealed, while the foot portion 120 of each of the insulating strips 119 remains in contact therewith for an interval of time which is adequate to permit the setting of the coalesced thermoplastic material.

While I have shown and described several specific embodiments of the present invention, it will be readily understood that I do not wish to be limited exactly thereto, since various modifications may be made without departing from the scope of the invention as defined in the following claims.

Having thus described the invention, what is claimed as new and desired to be secured by Letters Patent is:

1. The method of forming a container which comprises superficially sealing contiguous areas of sheet material in such manner that the seal is limited to the surfaces of the contiguous areas whereby said surfaces may be readily pulled apart without injury to the sheet material itself; said sheet material being free from tackiness at normal temperatures and possessed of such thermoplastic cohesive properties that it may be selectively bonded together either permanently or superficially, said method of superficial sealing including the step of heating said contiguous areas by subjecting them to the action of a high frequency electric field.

2. The method of forming a container which comprises superficially sealing contiguous areas of sheet material in such manner that the seal is limited to the surfaces of the contiguous areas whereby said surfaces may be readily pulled apart without injury to the sheet material itself; said sheet material being free from tackiness at normal temperatures and possessed of such thermoplastic cohesive properties that it may be selectively bonded together either permanently or superficially, said method of superficial sealing including the step of heating said contiguous areas by subjecting them to the action of a high frequency electric field and thereafter to pressure.

3. The method of forming an envelope for such products as tobacco and food particles from thermoplastic sheet material which is free from tackiness at normal atmospheric temperatures and which possesses such cohesive properties that it may be selectively bonded together either permanently or superficially, said method comprising juxtaposing layers of said thermoplastic sheet material in such manner as to define a wholly enclosed material storage space with portions of the sheet material bordering said space in contiguous relationship, permanently sealing said bordering areas in contact by creating thereat a dielectric heat by a relatively high intensity of radio frequency electric field which is sufficient to cause coalescence and permanent union thereof, and creating in the contiguous portions of the mouth of the envelope a lower dielectric heat by a relatively lower intensity of radio frequency electric field which, at contact pressure, is sufficient to produce surface adhesion but not permanent union, to thereby provide a superficial seal which may readily be manually separated without injury to either of the contiguous portions of the mouth.

4. The method of forming an envelope for such products as tobacco and food particles from thermoplastic sheet material which is free from tackiness at normal atmospheric temperatures and which possesses such cohesive properties that it may be selectively bonded together either permanently or superficially, said method comprising juxtaposing layers of said thermoplastic sheet material in such manner as to define a wholly enclosed material storage space with portions of the sheet material bordering said space in contiguous relationship, permanently sealing said bordering areas by creating thereat a relatively high radio frequency heat which, together with pressure, is sufficient to cause coalescence and permanent union thereof, and creating in the contiguous portions of the mouth of the envelope a relatively lower radio frequency heat which, together with pressure, is sufficient to produce surface adhesion but not permanent union, to thereby provide a superficial seal which may readily be manually separated without injury to either of the contiguous portions of the mouth.

References Cited in the file of this patent

UNITED STATES PATENTS

| Number | Name | Date |
|---|---|---|
| 2,478,857 | Brown et al. | Aug. 9, 1949 |
| 2,525,355 | Hoyler | Oct. 10, 1950 |
| 2,536,773 | Saidel | Jan. 2, 1951 |
| 2,539,375 | Snyder | Jan. 23, 1951 |
| 2,539,646 | Welch | Jan. 30, 1951 |